G. W. BROWN.
Flour and Middlings Purifier.

No. 160,080. Patented Feb. 23, 1875.

WITNESSES:
A. Bennendorf
C. Sedgwick

INVENTOR:
G. W. Brown
BY Munn & Co.
ATTORNEYS.

UNITED STATES PATENT OFFICE.

GEORGE WASHINGTON BROWN, OF METROPOLIS, ILLINOIS.

IMPROVEMENT IN FLOUR AND MIDDLINGS PURIFIERS.

Specification forming part of Letters Patent No. 160,080, dated February 23, 1875; application filed May 29, 1874.

*To all whom it may concern:*

Be it known that I, GEORGE W. BROWN, of Metropolis, in the county of Massac and State of Illinois, have invented a new and Improved Flour and Middlings Purifier, of which the following is a specification:

My invention relates to certain improvements in flour and middlings purifiers; and consists in the peculiar construction and arrangement of its parts, as will be hereinafter more fully described.

Figure 1:
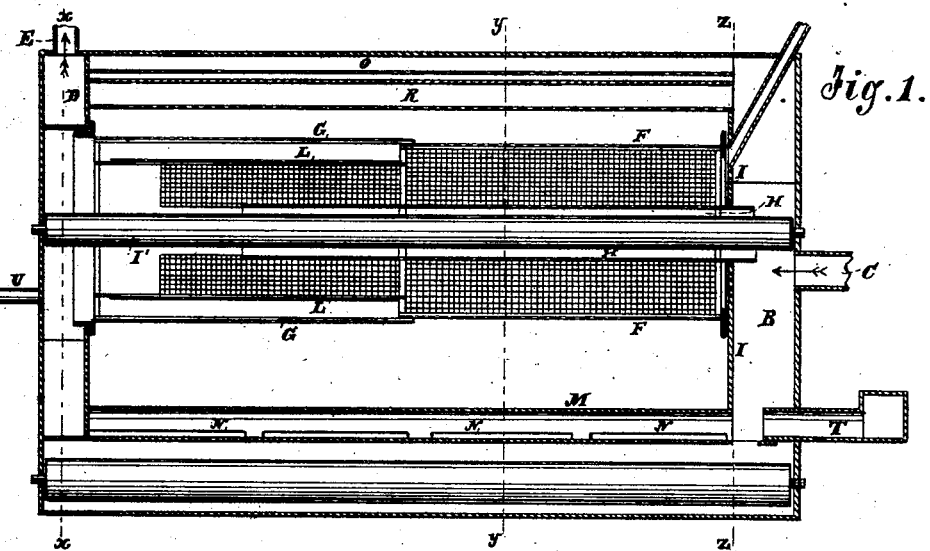
Figure 2:
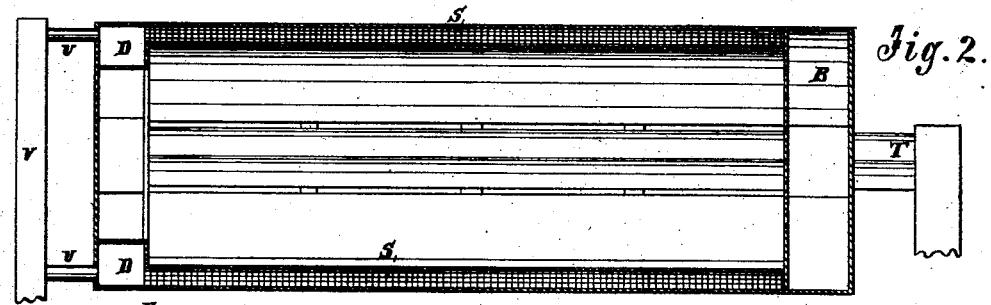
Figure 3:
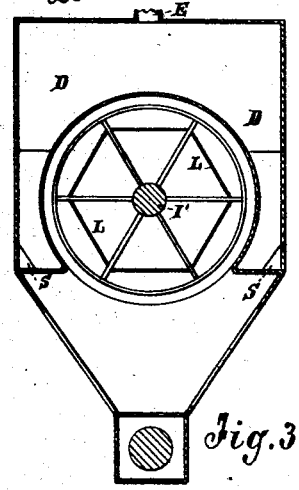
Figure 4:
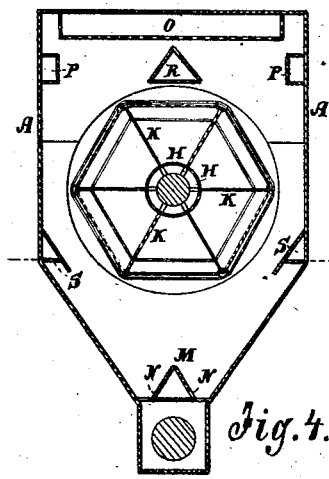
Figure 5:
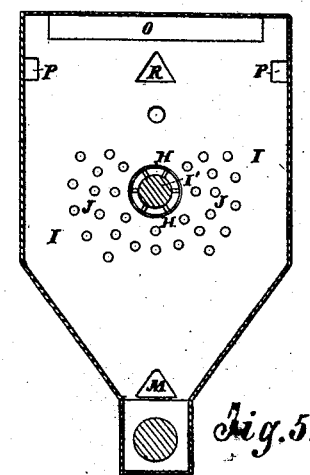

Figure 1 is a longitudinal sectional elevation of my improved flour and middlings purifier. Fig. 2 is a horizontal section. Fig. 3 is a transverse sectional elevation of Fig. 1, taken on the line $x\ x$. Fig. 4 is a transverse sectional elevation taken on the line $z\ z$.

Similar letters of reference indicate corresponding parts.

A represents the chest, which I propose to cover with paper or other sheathing to make it air-tight. B is a pressure-chamber, arranged at the head of the reel to receive the air from a blast-fan through the spout C. D is a vacuum-chamber at the tail end of the reel, for taking out the air through the pipe E or other pipes. F represents the upper portion of the bolt, covered with fine cloth. G represents the coarse middlings-cloth with which the lower portion of the reel is covered. H is a perforated tube surrounding the shaft 1', being considerably larger than the shaft to form an air-conductor, and extending along the reel about three-quarters of its length, with one end opening into the pressure-chamber to receive the air and conduct it along in the reel, and discharge it outward to the cloth, to aid in separating the bran and light matters from the middlings while falling or moving about in the reel. The partition I between the pressure-chamber and the reel is perforated at J to allow the air to blow in the reel and along it, for separating the light matters and conducting them along the reel to the tail. K represents radial perforated partitions in the reel, extending from the tube H to the ribs, for separating the coarse matters and working them along to the tail. L represents the inner bolt in the lower part of the main reel, to separate the coarser matters and free the middlings falling from it to the outer reel, to allow of more perfect action of the air on the remaining impurities as they pass with the middlings through the space between the two reels. The lower part G of the reel is made a little larger than the upper part to make room for the inner bolt L. Below the reel is a long triangular air-conductor, M, over the conveyer, receiving air from the pressure-chamber B, and delivering into the space below the bolt through slots N. Along the top of the case is a wide conductor, O, and along each side is a narrow one, P, also receiving air from the pressure-chamber B, and discharging it into the chest through perforations in the sides; and under the wide conductors is another one, R, in triangular form, receiving and discharging air in the same manner, but discharging it more directly upon the cloth, mainly to keep it clear, while from the other conductors it is more particularly designed to fill the space with air to counterbalance that blown into the reel, and prevent the latter from unduly forcing the impurities through the reel, and thus more completely suspending the light matters in the air to let the heavier matters fall. At the top of the fall-boards there is a conductor, S, on each side, having the front side inclined about the same as the fall-board, and also having a perforated bottom, and connected at the lower end of the reel with the suction-chamber D, for taking up the impurities from the flour and middlings as the air rises up through them while descending from the reel to the conveyer below. This lower blast-conductor M and the suction-conductors are applicable to a flour-bolt, for use without the other air apparatus, and in this case the air will be conducted directly through the blast-chamber to conductor M by a pipe, T, and from the suction-conductors it will be conducted away by pipes U V.

Suitable valves and regulators will be employed, in connection with the air passages and conductors, for regulating the air, as required.

Having thus described my invention, what I claim as new, and desire to secure by Letters Patent, is—

1. The combination of the perforated air-passages O P R S M, the perforated tube H, the pressure-chamber B, and the exhaust-chamber D with the bolting-reel, substantially as and for the purpose described.

2. The combination of the exterior bolt F G, interior bolt L, perforated tube H, and the perforated radial partitions K, all constructed and arranged to operate in the manner and for the purpose set forth.

3. The combination of the perforated air-passages O, P, R, S, and M, the perforated tube H, the pressure-chamber B, the exhaust-chamber D, the exterior bolts F G and interior bolt L, the perforated radial partitions K, the shaft I, and the perforated partition J, substantially as and for the purpose specified.

4. The perforated top and side conductors O and P, combined with the bolting-reel and the blast-chamber, substantially as specified.

GEORGE W. BROWN.

Witnesses:
WM. P. BRUNER,
W. R. BROWN.